(12) United States Patent
Kurcik et al.

(10) Patent No.: US 11,476,690 B2
(45) Date of Patent: *Oct. 18, 2022

(54) POWER SUPPLY SYSTEM

(71) Applicant: Samsung SDI Co., Ltd., Yongin-si (KR)

(72) Inventors: Peter Kurcik, Sankt Nikolai im Sausal (AT); Maximilian Hofer, Hartberg (AT); Markus Pretschuh, Graz (AT); Florian Maxl, Graz (AT); Mathias Pischler, Kalsdorf (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,325

(22) Filed: Sep. 1, 2020

(65) Prior Publication Data

US 2021/0126481 A1    Apr. 29, 2021

(30) Foreign Application Priority Data

Oct. 25, 2019  (EP) ...................................... 19205225
Aug. 31, 2020  (KR) ......................... 10-2020-0110371

(51) Int. Cl.
*H02J 7/00*  (2006.01)
*H02J 7/14*  (2006.01)
(Continued)

(52) U.S. Cl.
CPC ............ *H02J 7/0068* (2013.01); *B60L 58/18* (2019.02); *H01M 10/441* (2013.01); *B60L 2240/547* (2013.01)

(58) Field of Classification Search
USPC ........................................ 320/104, 109, 134
See application file for complete search history.

(56) References Cited

U.S. PATENT DOCUMENTS 6,771,188 B2    8/2004   Flick
6,915,192 B2    7/2005   Hashimoto et al.
(Continued)

FOREIGN PATENT DOCUMENTS

CN    202435069 U    9/2012
CN    104917215 A    9/2015
(Continued)

OTHER PUBLICATIONS

Extended European Search Report issued in EP Application No. 19205225.6, dated May 4, 2020, 10 pages.
(Continued)

*Primary Examiner* — Alexis B Pacheco
(74) *Attorney, Agent, or Firm* — Lewis Roca Rothgerber Christie LLP (57) ABSTRACT

A power supply system for a battery system of a vehicle is provided. The power supply system includes: a switch control unit configured to control a power switch to switch an external load; an electronic unit; a first power supply electrically connected to the switch control unit and electrically connected to the electronic unit; a second power supply; and a switching unit. In a normal mode, the first power supply electrically supplies the electronic unit. The switching unit is configured to, in a cold crank mode: electrically disconnect the first power supply from the electronic unit when a voltage of the first power supply drops below a threshold voltage; and electrically connect the second power supply to the electronic unit when the voltage of the first power supply drops below the threshold voltage such that the second power supply powers the electronic unit in the cold crank mode.

20 Claims, 3 Drawing Sheets

(51) Int. Cl.
  *H01M 10/44* (2006.01)
  *B60L 58/18* (2019.01)

(56) References Cited

U.S. PATENT DOCUMENTS

| | | | |
|---|---|---|---|
| 7,119,459 | B2 | 10/2006 | Bruwer et al. |
| 7,251,551 | B2 | 7/2007 | Mitsueda et al. |
| 7,453,235 | B2 | 11/2008 | Blair et al. |
| 7,683,576 | B2 | 3/2010 | Tien et al. |
| 8,004,238 | B2 | 8/2011 | Kim et al. |
| 8,018,702 | B2 | 9/2011 | Maeda et al. |
| 8,602,141 | B2 | 12/2013 | Yee et al. |
| 8,669,739 | B2 | 3/2014 | Ohtomo |
| 8,865,328 | B2 | 10/2014 | Kim et al. |
| 8,938,323 | B2 | 1/2015 | Lee |
| 9,000,718 | B2 | 4/2015 | Park |
| 9,030,167 | B2 | 5/2015 | Yamaguchi et al. |
| 9,054,538 | B2 | 6/2015 | Kim |
| 9,252,462 | B2 | 2/2016 | Kim |
| 9,255,957 | B2 | 2/2016 | Arima et al. |
| 9,397,370 | B2 | 7/2016 | Nebrigic et al. |
| 9,544,967 | B2 | 1/2017 | Recker et al. |
| 9,748,548 | B2 | 8/2017 | Malcolm et al. |
| 9,851,413 | B2 | 12/2017 | Jeon |
| 10,160,326 | B2 | 12/2018 | Chung et al. |
| 10,389,144 | B2 | 8/2019 | Jin |
| 10,804,717 | B1 | 10/2020 | Gaide et al. |
| 11,173,793 | B2 * | 11/2021 | Moriya ............. H02J 7/007194 |
| 2003/0085621 | A1 | 5/2003 | Potega |
| 2005/0228562 | A1 | 10/2005 | Sayama et al. |
| 2010/0209748 | A1 | 8/2010 | Kudo et al. |
| 2011/0001357 | A1 | 1/2011 | Li et al. |
| 2011/0169450 | A1 | 7/2011 | Hudnall et al. |
| 2012/0187887 | A1 | 7/2012 | Sone |
| 2014/0028098 | A1 | 1/2014 | Trigiani |
| 2014/0181541 | A1 | 6/2014 | Matsumoto |
| 2015/0120129 | A1 | 4/2015 | Lee |
| 2016/0207418 | A1 | 7/2016 | Bergstrom et al. |
| 2016/0226107 | A1 | 8/2016 | Worry et al. |
| 2016/0352131 | A1 | 12/2016 | Nelson |
| 2018/0186244 | A1 | 7/2018 | Harvey et al. |
| 2018/0212449 | A1 | 7/2018 | Park et al. |
| 2018/0254732 | A1 | 9/2018 | Smolenaers |
| 2018/0257506 | A1 | 9/2018 | Thieme et al. |
| 2019/0372381 | A1 * | 12/2019 | Hofer ................... H02J 7/00308 |
| 2020/0020992 | A1 * | 1/2020 | Hofer ................... H02J 7/0031 |
| 2020/0119574 | A1 * | 4/2020 | Wang ................... H02J 7/0071 |
| 2020/0195033 | A1 * | 6/2020 | Tajima ................ H01M 10/441 |
| 2020/0313458 | A1 * | 10/2020 | Moriya ................. H02J 7/0016 |
| 2021/0028503 | A1 * | 1/2021 | Hilligoss ............. H01M 10/441 |
| 2021/0143486 | A1 | 5/2021 | Kurcik et al. |

FOREIGN PATENT DOCUMENTS

| | | | |
|---|---|---|---|
| EP | 2 897 250 | A1 | 7/2015 |
| EP | 2 919 346 | A1 | 9/2015 |
| JP | 2007-274866 | A | 10/2007 |
| WO | WO 2014/098875 | A1 | 6/2014 |
| WO | WO 2018/231573 | A1 | 12/2018 |
| WO | WO 2019/111878 | A1 | 6/2019 |

OTHER PUBLICATIONS

Notice of Allowance issued in U.S. Appl. No. 16/367,015, dated Jun. 2, 2022, 8 pages.
European Communication pursuant to Article 94(3) EPC, for Patent Application No. 19 205 225.6, dated May 23, 2022, 7 pages.
Ex Parte Quayle action from USPTO for U.S. Appl. No. 16/367,015, mailed Jul. 9, 2021, 6 pages.
Extended European Search Report, European Application No. 18182603.3, dated Jan. 24, 2019, 7 pages.
Notice of Allowance from USPTO for U.S. Appl. No. 16/367,015, dated Sep. 17, 2021, 14 pages.
Notice of Allowance from USPTO for U.S. Appl. No. 16/367,015, dated Feb. 10, 2022, 5 pages.
Office action from USPTO for U.S. Appl. No. 16/367,015, dated Mar. 26, 2021, 15 pages.
Restriction Requirement from USPTO for U.S. Appl. No. 16/367,015, dated Jan. 8, 2021, 7 pages.

* cited by examiner

POWER SUPPLY SYSTEM

CROSS-REFERENCE TO RELATED APPLICATION

This application claims priority to and the benefit of European Patent Application No. 19205225.6, filed in the European Patent Office on Oct. 25, 2019, and Korean Patent Application No. 10-2020-0110371, filed in the Korean Patent Office on Aug. 31, 2020, the entire contents of both of which are incorporated herein by reference.

BACKGROUND

1. Field

Aspects of embodiments of the present disclosure relate to a power supply system and a vehicle including the power supply system.

2. Background

In recent years, vehicles have been developed that use electric power as a source of motion (or propulsion). An electric vehicle is an automobile that is powered by an electric motor using energy stored in rechargeable (or secondary) batteries. An electric vehicle may be solely powered by batteries or may be a hybrid vehicle at least partially powered by, for example, a gasoline generator. For example, the hybrid vehicle may include a combination of an electric motor and a conventional combustion engine. Generally, an electric-vehicle battery (EVB), also referred to as a traction battery, is a battery used to power the propulsion (e.g., the propulsion source or motor) of a battery electric vehicle (BEV). Electric-vehicle batteries differ from starting, lighting, and ignition batteries in that they are designed to provide (or output) power over sustained periods of time.

A rechargeable (or secondary) battery differs from a primary battery in that it is designed to be repeatedly charged and discharged, while the latter provides an irreversible conversion of chemical to electrical energy. Low-capacity rechargeable batteries are often used as power supplies for small electronic devices, such as cellular phones, notebook computers, and camcorders, while high-capacity rechargeable batteries are often used as power supplies for hybrid vehicles and the like.

Rechargeable batteries may be a battery module including (or formed of) a plurality of unit battery cells coupled to each other in series and/or in parallel to provide high energy density, such as for motor driving of a hybrid vehicle. A battery module may be formed by interconnecting electrode terminals of the unit battery cells to each other, with the number of unit battery cells being determined based on a desired (or required) amount of power and to provide a high-power rechargeable battery. The unit cells may be connected to each other in series, parallel, or in a mixture of both to deliver the desired voltage, capacity, and/or power density. Components of battery packs include the individual battery modules and the interconnects, which provide electrical conductivity therebetween.

Static control of battery power output and charging may not be sufficient to meet the dynamic power demands of various electrical consumers (e.g., electrical components) connected to the battery system. Thus, steady exchange of information between the battery system and the controllers of the electrical consumers may be employed. This information may include the battery system's actual state of charge (SoC), potential electrical performance, charging ability and internal resistance as well as actual or predicted power demands or surpluses of the consumers.

Battery systems generally include a battery control (e.g., a battery controller) for processing the aforementioned information. The battery control may include (or may communicate with) controllers of the various electrical consumers, and the battery system may include suitable internal communication busses (e.g., a SPI or CAN interface). The battery control may also communicate with battery submodules, for example with cell supervision circuits or cell connection and sensing units. Thus, the battery control may be provided to manage the battery stack, such as by protecting the battery from operating outside its safe operating parameters, monitoring its state, calculating secondary data, reporting that data, controlling its environment, authenticating it and/or balancing it, etc. Typically, the battery control may control a power switch to a load and may switch (e.g., may disconnect) the load in various fault situations.

In a cold crank case, the power supply for various electronic units of a battery system may not provide sufficient power during a transient time regime. For example, a board net voltage may drop down to about 3 V (volts) during a cold crank, which is insufficient to power one or more electronic units.

Conventionally, boost converters may be used to support cold crank functionality. For example, boost converters may boost dropped supply voltages from about 3 V up to about 6 V to adequately supply the power consuming electronic units.

However, boost converters include at least inductors, caps, diodes, one or more MOSFETs, and shunts, which makes them costly. Furthermore, the circuitry has to provide (or power) electronic units and power switches (e.g., relays), which often requires several watts of output power. Thus, to boost a voltage from about 3 V, a current of about 1 A (amp) may be required.

SUMMARY

According to aspects and features of the present disclosure, a power supply system for a battery system that provides electrical components with persistent and sufficient power even during cold crank conditions without using a boost converter is provided.

A power supply system that provides cold crank functionality for a battery system of a vehicle is provided. The power supply system may include a switch control unit (e.g., a switch controller) for controlling a power switch to switch an external load and an electronic unit. The power supply system may include (or may be connected to) a first power supply that is electrically connected to the switch control unit to electrically supply (e.g., to power) the switch control unit. The first power supply is also electrically connected to the electronic unit to supply the electronic unit in a normal mode. The power supply system may further include (or may be further connected to) a second power supply. Further, the power supply system further includes a switching unit (e.g., a switch). When the voltage of the first power supply drops below a threshold voltage, such as during a cold crank (or in a cold crank mode), the switching unit is configured to electrically disconnect the first power supply from the electronic unit and to electrically connect the second power supply to the electronic unit so that the second power supply supplies the electronic unit, ensuring adequate power is supplied to the electronic unit even during a cold crank.

The cold crank mode may occur when the supply voltage of the first power supply drops below the threshold voltage due to, for example, a cold crank. The normal mode may refer to the normal operating condition when the supply voltage of the first power supply is above the threshold voltage. The electronic unit may be considered a power consuming electronic unit or a power consuming electronic component of a battery system. In a battery system, several electronic units need to be supplied with sufficient power. In some embodiments, the electronic unit is a microprocessor, but the present disclosure is not limited thereto. For example, the electronic unit in a power supply system may be a CAN transceiver or a high side-low side switch. These electronic units generally require a supply voltage of, for example, about 5 V. In the cold crank mode (or during a cold crank), the first power supply may drop below the required supply voltage and may drop down to, for example, about 3 V for a time window of typically about 10 ms to about 15 ms.

The power switch may be a relay, but the present disclosure is not limited thereto. For example, the power switch may be a power FET or a power MOSFET. The power switch (e.g., the relay) may remain controllable with a supply voltage of about 3 V or even below about 3 V. For example, the switch control unit and/or the power switch (e.g., the relay) may only require about 2.4 V nominally. Therefore, the power switch unit according to the present disclosure may still be controlled by the first power supply even in the cold crank mode when the voltage of the first power supply drops. The electronic unit, which may be a separate unit from the switch control unit, is electrically connected to the second power supply in the cold crank mode (or during a cold crank) to be powered by the second power supply.

The first and second power supplies may be independent and/or separate from each other, and the second power supply may not be affected (or not substantially affected) during the cold crank. Thus, according to aspects and features of embodiments of the present disclosure, the second power supply supplies power to the electronic unit or units when the first power supply drops below a threshold voltage (e.g., about 5 V). The switching unit may be separate from the electronic unit, but the present disclosure is not limited thereto and the switching unit may be integrated into the electronic unit. As used herein, electrically disconnect may indicate that the corresponding power supply does not supply any power to the electronic unit, and electrically connect may indicate that the corresponding power supply supplies power to the electronic unit. By using the second power supply to supply power to the electronic unit during the cold crank time window, a boost converter may be omitted while ensuring persistent power supply to the electronic unit, even during a cold crank.

In an embodiment, the first power supply may be a board net voltage of a vehicle, and the second power supply may be a battery cell stack including a plurality of battery cells. The board net voltage may be, for example, a 12 V board net, which is the conventional supply board net in an electric vehicle. The 12 V board net may be provided by, for example, a 12 V battery, such as a lead acid battery or a Nickel-Cadmium battery, but the present disclosure is not limited thereto. The second power supply may be the system voltage of the battery cell stack, which may provide 48 V, but the present disclosure is not limited thereto. The 48 V output may be provided by a stack of twelve battery cells, each having a nominal output voltage of about 4 V, but the present disclosure is also not limited thereto. In other embodiments, the second power supply may be an intermediate output voltage from a sub stack of the above described battery stack providing 4*n V, where n is the number of battery cells in the sub stack.

The threshold voltage may be between about 5 V and about 6 V but may be, in other embodiments, between about 5 V and about 5.5 V or between about 5 V and about 5.2 V. These thresholds ensure that the power supply does not drop below 5 V, which for many electronic units, such as a microprocessor or CAN transceiver, is the required supply voltage. Therefore, when the voltage of the first power supply reaches or goes below the threshold voltage, the second power supply is electrically connected to the electronic unit such that sufficient power is supplied thereto.

The switching unit may be configured to electrically connect the first power supply to the electronic unit and electrically disconnect the second power supply from the electronic unit when the voltage of the first power supply rises above the threshold voltage (e.g., when the first power supply recovers). Thereby, the second power supply is loaded only for the minimum amount of time necessary. Generally, the voltage drop of the first power supply may last for only several milliseconds (ms), usually about 10 ms to about 15 ms, and after this time interval, the first power supply may then fulfill its role as the primary power supplier to the electronic unit.

The switching unit may have a first input electrically connected to the first power supply, a second input electrically connected to the second power supply, and an output electrically connected to the electronic unit. The switching unit is thereby a separate unit that receives voltages from both the first and second power supplies.

In an embodiment, the switching unit may include a first diode, a second diode, and an output node. The first power supply may be electrically connected to the anode of the first diode, the second power supply may be electrically connected to the anode of the second diode, and the output node may be electrically connected to the cathode of each of the first and second diodes. The output node may also be electrically connected to the electronic unit. A diode is an electronic element which conducts current primarily in one direction. Thus, diodes generally have low resistance when forward biased and high resistance when reverse biased. By including diodes in the switching unit, the switching unit may automatically switch the power supply that is supplying the electronic unit. The connected diodes selects (or sets) the one of the first and second power supplies that has the higher voltage to be conductive (e.g., to be connected to the output node) and selects (or sets) the one of the first and second power supplies that has the lower voltage to be non-conductive (e.g., to be disconnected from the output node). The switching is, thus, dependent on the voltages applied to the respective diodes. A voltage below the threshold voltage (e.g., less than about 5 V) at the anode of the first diode will set the first diode to be non-conductive, thus effectively disconnecting the first power supply from the electronic unit, while the second diode is set to be conductive or, in other words, is forward biased, thus effectively connecting the second power supply to the electronic unit.

At least the second diode may be a low drop-out diode. Low drop-out diodes may also be referred to as active diodes. Low drop-out diodes have a reduced inner voltage drop, such that voltage losses are reduced or even eliminated. For example, when the voltage input to the anode of a low drop-out diode is 5 V, substantially 5 V will be supplied to the cathode of the diode (e.g., supplied to the electronic unit during the cold crank mode).

In an embodiment, the second power supply is a battery cell stack including a plurality of battery cells arranged between a first node and a second node. The second node may have a higher electrical potential than the first node and may be electrically connected to the second input of the switching unit. In one embodiment, the first and the second nodes are at the ends of the battery cell stack, but the present disclosure is not limited thereto. The first node may be set to ground potential.

The power supply system may include a voltage regulator electrically interconnected between the second node of the battery cell stack and the second input of the switching unit. The voltage regulator may be configured to reduce an input voltage received from the second node to an output voltage that is lower than the input voltage and is supplied to the switching unit. In some embodiments, the voltage at the second node is 48 V, which is generally too high to supply to the electronic units. By using the automatic diodes to switch the power supplies, the voltage has to be reduced from 48 V to, for example, about 5 V by the voltage regulator. The voltage regulator includes substantially fewer components than a boost converter.

In an embodiment, the power supply system may include an analog front-end chip (AFE), which is electrically connected to the first node and the second node of the battery cell stack to receive the voltage therebetween. The AFE may include an internal voltage regulator configured to reduce a received (or input) voltage to an output voltage, which is lower than the received (or input) voltage, and the AFE may be configured supply the output voltage to the second input of the switching unit. The AFE may be configured to measure several quantities along the battery stack including, for example, the charging/discharging current, the temperature, voltages and cell voltages, etc. For example, the AFE chip may receive the voltage difference between the first and second nodes. The internal voltage regulator may transform the input voltage into a lower output voltage suitable for supplying the electronic unit during cold crank conditions. Thus, a separate voltage regulator may be omitted.

The voltage regulator and/or the internal voltage regulator may be a low drop-out regulator and/or at least one of the voltage regulators may be configured to output a voltage of at least about 5 V. These regulators may be transistor-Zener-diode regulators, which include resistors, transistors, and a Zener-diode, but the present disclosure is not limited thereto and other voltage regulator implementations may be used.

In an embodiment, a power supply regulator may be interconnected between the switching unit and the electronic unit. The power supply regulator may be configured to regulate the received voltage to a supply voltage required by the electronic unit. Thereby, individual voltages can be adapted and varied for the corresponding electronic units.

The electronic unit may be a microprocessor, and the microprocessor may be the primary electronic unit in the power supply system for safety purposes (e.g., the microprocessor may control the power switch) and, thus, should be persistently supplied with power. Therefore, in cold crank conditions, the microprocessor should not be rendered unavailable. Aspects and features of embodiments of the present disclosure ensure a persistent power supply to the microprocessor via the second power supply.

In an embodiment, the microprocessor may be configured to switch into a low power consumption mode when the microprocessor detects that the supplied power has dropped below a threshold power. The low power consumption mode may also be referred to as a sleep mode. Because the power supplies, such as the AFE, may support smaller currents, for example, about 5 mA to about 10 mA, a low power consumption mode may be suitable to match the reduced power provided. Thus, the microprocessor may be configured to change to a low power consumption mode. In the low power consumption mode, the microprocessor may be capable of performing core functions, for example, security relevant functions, including being able to control the power switch and initiate a switch off if a fault state is detected.

According to an embodiment of the present disclosure, a battery system including the power supply system as described above is provided.

According to an embodiment of the present disclosure, a vehicle including the power supply system as described above is provided.

Further aspects and features of the present disclosure may be learned from the following description.

BRIEF DESCRIPTION OF THE DRAWINGS

Aspects and features of the present disclosure will become apparent to those of ordinary skill in the art by describing, in detail, exemplary embodiments thereof with reference to the attached drawings in which.

DETAILED DESCRIPTION DISCLOSURE

Reference will now be made in detail to embodiments, examples of which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. As used herein, the term "and/or" includes any and all combinations of one or more of the associated listed items. Further, the use of "may" when describing embodiments of the present disclosure refers to "one or more embodiments of the present disclosure." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Figure 1:
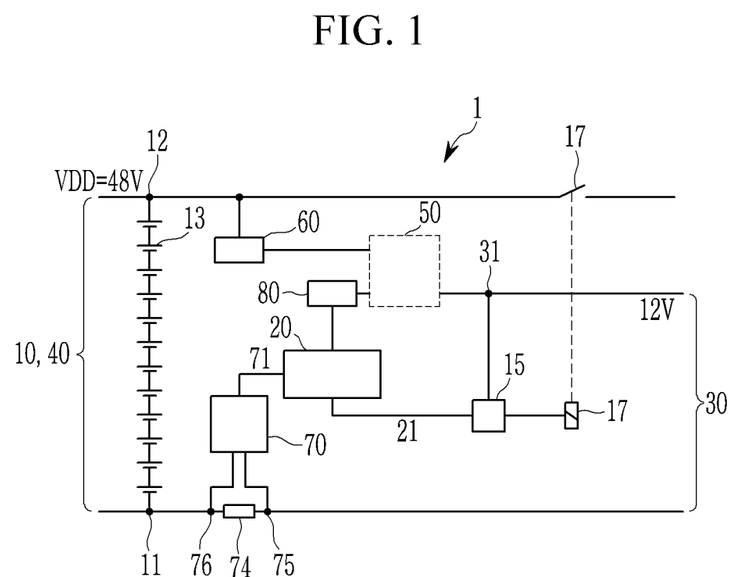
FIG. 1 illustrates a power supply system according to a first embodiment of the present disclosure.

FIG. 1 shows a power supply system 1 configured to provide cold crank functionality for a battery system of a vehicle according to a first embodiment of the present disclosure. The power supply system 1 includes a switch control unit (e.g., a switch controller) 15 for controlling a power switch 17 to switch an external load. The power switch 17 may be a relay, and the switch control unit 15 may be a relay control unit (e.g., a relay controller) and may be referred to herein as the relay control 15. In other embodiments, the switch control unit 15 may be a power FET or a power MOSFET.

The power supply system 1 further includes an electronic unit 20. The electronic unit 20 may refer to a power consuming electronic unit, which may be, for example, a CAN transceiver. In the embodiments shown in FIGS. 1-3, the electronic unit 20 may be a microprocessor and may be referred to as "the microprocessor 20" herein, but the present disclosure is not limited thereto.

A first power supply 30 is electrically connected to the switch control unit 15. A node 31 is formed at where the voltage is supplied from the first power supply 30, and the node 31 is electrically connected to an input of the switch control unit 15. Thereby, the first power supply 30 is configured to supply the switch control unit 15 with electric power. The node 31 and the line connected to the node 31 (indicated by 12 V) may have a high potential provided by the first power supply 30, while the other line may be grounded (e.g., the lower line in FIG. 1).

In a normal mode, the first power supply 30 is further electrically connected to the electronic unit 20 and is configured to supply the electronic unit 20 with power in the normal mode.

The power supply system 1 further includes a second power supply 40. The second power supply 40 may be a battery cell stack 10 generating a system voltage VDD at the ends of the battery cell stack 10. In the example embodiments shown in FIGS. 1-3, the system voltage VDD is shown as being 48 V, but the present disclosure is not limited thereto. As an example, the 48 V output may be provided by a stack of 12 battery cells, each having a nominal output voltage of 4 V, but this is merely an example. The second power supply 40 may be, for example, an intermediate output voltage from a sub stack of the above-described battery cell stack 10.

The power supply system 1 further includes a switching unit 50. The switching unit 50 is configured to electrically disconnect the first power supply 30 from the electronic unit 20 in a cold crank mode. A cold crank mode occurs (or is enabled, etc.) when the supply voltage of the first power supply 30 drops or is below a threshold voltage. Usually, such a voltage drop occurs for a relatively short time window, for example, about 10 milliseconds to about 15 milliseconds.

The switching unit 50 is also configured to connect the second power supply 40 to the electronic unit 20 in the cold crank mode such that the second power supply 40 supplies the electronic unit 20 in the cold crank mode. Thereby, the electronic unit 20 (e.g., the microprocessor) is consistently supplied with adequate power throughout the transient time window of a cold crank. As can be seen in FIG. 1, the first power supply 30 remains electrically connected to the switch control unit 15 in the cold crank mode to supply power to the switching unit (e.g., the switch controller) 15 in the cold crank mode. For example, the node 31 is interconnected between the switching unit 50 and the first power supply 30.

The first power supply 30 may be (or may provide) a board net voltage of a vehicle. The board net voltage, as shown in this example embodiment, may be 12 V in a normal mode. In a cold crank case, the supply voltage of the first power supply 30 may drop to a lower bound above zero, for example, about 3 V for a time (e.g., between about 10 ms to about 15 ms). For example, about 3 V may be a lower bound such that the board net voltage does not drop below 3 V, and about 3 V may be sufficient to provide power to the switch control unit 15 to operate the power switch 17. The switch control unit 15 (e.g., the relay control) may operate at a voltage below 3 V, for example, about 2.4 V, such that the first power supply 30 continues to supply (e.g., continues to adequately supply) the switch control unit 15 even during a decrease (or dip) in the board net voltage. Therefore, in cold crank mode, the second power supply 40 may not be unnecessarily loaded.

Figure 2:
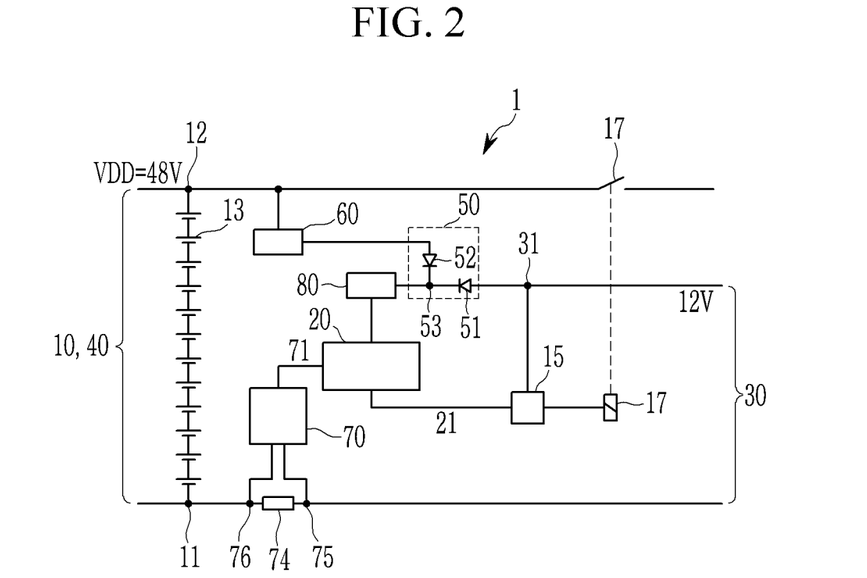
FIG. 2 illustrates a power supply system according to a second embodiment of the present disclosure.
Figure 3:
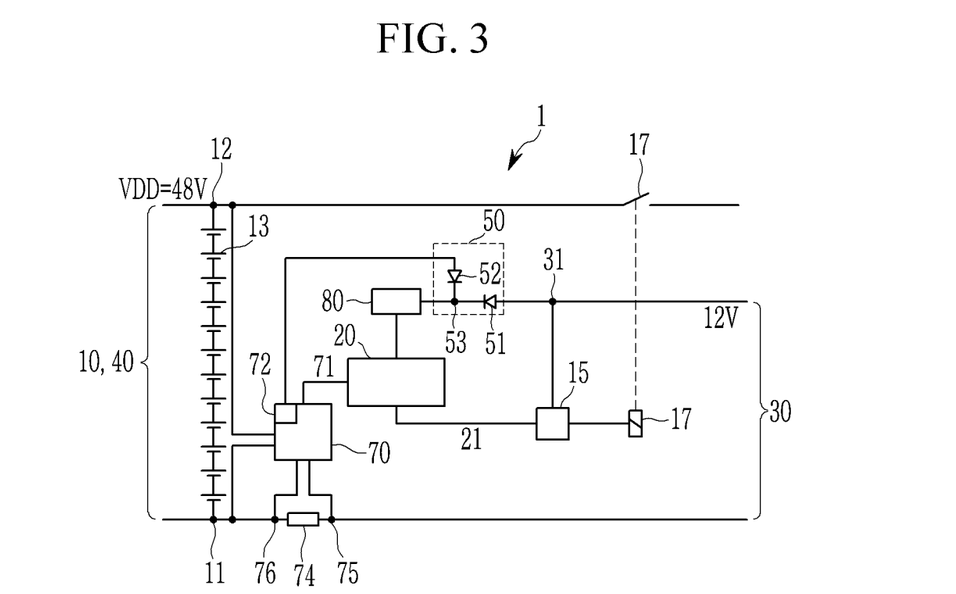
FIG. 3 illustrates a power supply system according to a third embodiment of the present disclosure.

The electronic unit 20 is persistently provided with a voltage above the threshold voltage by the second power supply 40. The first and second power supplies 30, 40 may be independent and/or separate from each other, as can be seen in FIGS. 1-3, and only the first power supply 30 may be affected by the cold crank. Thus, the second power supply 40 may be configured to support the electronic unit 20 (e.g., provide power to the electronic unit 20) during a cold crank. The threshold voltage may be set to be between about 5 V and about 6 V, for example, between about 5 V and about 5.5 V or between about 5 V and about 5.2 V. The electronic unit 20 within the battery system 1 may require about 5 V as a voltage input. When the electronic unit 20 requires an input voltage of about 5 V, a threshold voltage of about 5 V ensures that voltage requirements of the electronic unit 20 are met throughout a crank cold time regime.

Also, in the reverse case when the voltage of the first power supply 30 rises above the threshold voltage after a cold crank event (e.g., when the voltage of the first power supply 30 recovers), the switching unit 50 may be configured to electrically connect the first power supply 30 to the electronic unit 20 and electrically disconnect the electronic unit 20 from the second power supply 40. Then, the original operating condition of the power supply system 1 (e.g., the normal operating mode) is reestablished. Once the threshold voltage is passed, the first power supply 30 is again available to provide sufficient power to the electronic unit 20 and the second power supply 40 is no longer needed for this purpose. Thus, the time in which the second power supply 40 is required by the power supply system 1 is thereby reduced or minimized.

The switching unit 50 may be interconnected between the first power supply 30 and the electronic unit 20 and between the second power supply 40 and the electronic unit 20. For example, a first input of the switching unit 50 may be electrically connected to the first power supply 30, and a second input of the switching unit 50 may be electrically connected to the second power supply 40. Thereby, both voltages of the first and second power supplies 30, 40 are supplied to the switching unit 50. The switching unit 50 may have an output that is electrically connected to the electronic unit 20. The switching unit 50 is thereby an individual component which, in the normal mode as well as in the cold crank mode, receives both voltages of the first and second power supplies 30, 40 and supplies one of them to the electronic unit 20 based on the operating mode. In other embodiments, the switching unit 50 may be integrally formed with the electronic unit 20.

The battery cell stack 10 of the second power supply 40 may have a first node 11 and a second node 12. As an example, the nodes 11, 12 are positioned at opposite ends of the battery cell stack 10 such that a potential difference therebetween refers to the system voltage VDD provided by the battery cell stack 10 (e.g., 48 V in the illustrated embodiment). The first node 11 may be a ground, and the second node 12 may be a high voltage node.

The second node 12 may be electrically connected to the second input of the switching unit 50. Thereby, the high potential of the battery cell stack 10 may be supplied to the switching unit 50 and, in the cold crank state, may supply power to the electronic unit 20.

In the embodiment shown in FIG. 1, a voltage regulator 60 may be electrically interconnected between the second node 12 of the battery cell stack 10 and the switching unit 50. For example, the input of the voltage regulator 60 may be electrically connected to the second node 12 of the battery cell stack 10, and an output of the voltage regulator 60 may be electrically connected to the second input of the switching unit 50. The voltage regulator 60 may be configured to reduce the input voltage (e.g., the 48 V input voltage) to an output voltage that is lower than the input voltage, such as the operation voltage of the electronic unit (e.g., the microprocessor) 20 and other electronic units (e.g., about 5 V). In other embodiments, the voltage regulator 60 may be configured to output a voltage of at least 5 V or between about 5 V and about 6 V, or between about 5 V and about 5.5 V, or between about 5 V and about 5.2 V. The output voltage of the voltage regulator 60 may correspond to (e.g., may be used to define or set) the threshold voltage.

The voltage regulator 60 may be a low-dropout regulator, which generally only includes a Zener-diode, resistors, and a MOSFET and, as such, is far less costly than a boost converter. The external voltage regulator 60 provides an operational voltage from the otherwise too high output voltage of the battery cell stack 10 for the power consuming electronic unit 20 in the cold crank mode (e.g., when the first power supply 30 cannot supply sufficient voltage in a transient cold crank time window of about 10 ms to about 15 ms). In the cold crank mode, the regulated voltage from the voltage regulator 60 may be supplied to the electronic unit 20.

Further, the power supply system 1 may include a power supply regulator 80 interconnected between the switching unit 50 and the electronic unit 20. The power supply regulator 80 is configured to regulate (e.g., down-regulate) an input voltage to an operational voltage of the electronic unit 20, for example, for a particular time interval or for particular tasks.

For completeness of the description of FIG. 1, the power supply system 1 may further include an analog front-end chip (AFE) 70 to sense and receive analog data of various relevant parameters of the battery cell stack 10. A shunt 74 may be positioned in series with the first node 11. Two nodes 75, 76 are connected on opposite sides of the shunt 74, and the two nodes 75, 76 are electrically connected to the AFE 70. The AFE 70 may control (e.g., may determine) charging/discharging current through the shunt 74 by measuring the voltage drop (e.g., the relatively small voltage drop) across the shunt 74, which has a reference resistance (e.g., a relatively small reference resistance). Other parameters, such as the temperature or individual cell voltages, may be measured.

The AFE 70 may send a state signal to the microprocessor 20 via a control line 71 that indicates the measured quantity. In response to the received state signal, the microprocessor 20 may send a control signal via a control line 21 to the switch control unit 15. For example, when the AFE 70 measures an analog value indicative of a fault state of the battery cell stack 10 (e.g., indicating a fault of or within the battery cell stack 10), a state signal indicative of the fault state may be sent to the microprocessor 20 via the control line 71. In response to the received state signal, the microprocessor 20 may send a control signal to the relay control 15 via the control line 21 to control the relay control 15 to switch the power switch 17 when a fault state is detected.

FIG. 2 illustrates a power supply system 1 according to a second embodiment of the present disclosure. In the following, the differences with respect to the embodiment shown in FIG. 1 will be primarily described. Elements and components that are the same or substantially the same between the embodiments shown in FIGS. 1 and 2 may not be described again.

In the embodiment shown in FIG. 2, a switching unit 50 is configured to automatically select the power supply 30, 40 with (e.g., outputting) the higher supply voltage. The switching unit 50 may include a first diode 51, a second diode 52, and an output node 53.

The first power supply 30 may be electrically connected to the anode of the first diode 51, the second power supply 40 may be electrically connected to the anode of the second diode 52, and the output node 53 may be electrically connected to the cathode of each of the first and second diodes 51, 52. The output node 53 may be further electrically connected to the electronic unit 20. Different from the switching unit 50 shown in FIG. 1, the switching unit 50 shown in FIG. 2 automatically connects the power supply 30, 40 having the higher voltage to the electronic unit 20. The connected diodes 51, 52 select or set the power supply 30, 40 with the higher voltage to be conductive to the electronic unit 20 and disconnect or set the power supply 30, 40 with the lower voltage non-conductive to the electronic unit 20.

For example, the voltage applied to the anode of the second diode 52 coincides with the threshold voltage. Generally, due to the voltage regulator 60 shown in FIG. 1 or the internal voltage regulator 72 shown in FIG. 3 (described in more detail below), this voltage may be set to about 5 V or slightly more, for example, about 5 V plus the voltage drop across the second diode 52, but the present disclosure is not limited thereto. Also, the threshold voltage may be between about 5 V and about 6 V, or between about 5 V and about 5.5 V, or between about 5 V and about 5.2 V.

A voltage below about 5 V at the anode of the first diode 51 may set the first diode 51 into a non-conductive state because it is then reverse biased when about 5 V is applied to the anode of the second diode 52. Thus, the switching unit 50 effectively disconnects the first power supply 30 while the second diode 52 is set conductive because it is then forward biased. When the first power supply 30 (e.g., the voltage applied to the anode of the second diode 52) recovers to a voltage above the threshold voltage, for example, after the cold crank time window, the first diode 51 becomes forward biased and the second diode 52 becomes reverse biased. Thus, the switching unit 50 automatically disconnects the second power supply 40 and electrically connects the first power supply 30 to the electronic unit 20 when the voltage of the first power supply 30 recovers to above the threshold voltage. Therefore, the switching unit 50 shown in FIG. 2 automatically switches without requiring additional control units.

In an embodiment, the second diode 52 and/or the first diode 51 may be a low drop-out diode. Low drop-out diodes may also be referred to as active diodes. Low drop-out diodes have a reduced inner voltage drop such that voltage losses are reduced or even eliminated. When a voltage of about 5 V is applied to the anode of the second diode 52, for example, substantially 5 V is supplied to the electronic unit 20 during a cold crank.

FIG. 3 shows a power supply system 1 according to a third embodiment of the present disclosure. The differences with respect to the embodiments shown in FIGS. 1 and 2 will be primarily described below. Elements and components that are the same or substantially the same between the embodiments shown in FIGS. 1-3 may not be described again. Even though the following embodiment is described as including the switching unit 50 as described above with respect to FIG. 2, it is clear that the following embodiment can also be combined with the features (e.g., the switching unit 50) as shown in FIG. 1.

In this embodiment, the power supply system 1 may include the analog front-end chip (AFE) 70. The AFE 70 is electrically connected to the first node 11 and the second node 12 of the battery cell stack 10 to measure and receive the voltage between the nodes 11, 12. Again, as discussed above with respect to other embodiments, the AFE 70 may receive cell voltages of individual battery cells 13 or sub stacks of the battery cell stack 10. Therefore, first node 11 and second node 12 may have different positions within or on the battery cell stack 10. In this embodiment, the first node 11 and the second node 12 are illustrated as being positioned at the respective ends of the battery cell stack 10. The AFE 70, thus, receives the system voltage VDD, typically 48 V, but the present disclosure is not limited thereto.

In this embodiment, the AFE 70 may include an internal voltage regulator 72. The internal voltage regulator 72 may be configured to reduce the received voltage to an output voltage lower than the input (or received) voltage. For example, the output voltage of the internal voltage regulator 72 and, thus the output voltage of the AFE 70, may be at least about 5 V (e.g., exactly 5 V or slightly above 5 V) to compensate for a voltage loss at the second diode 52. The voltage may be between about 5 V and about 6 V, between about 5 V and about 5.5 V, or between about 5 V and about 5.2 V.

The AFE 70 may be configured to supply the output voltage to the second input of the switching unit 50 or, when applied to the embodiment described above with respect to FIG. 2, to the anode of the second diode 52.

The internal voltage regulator 72 may be a low-dropout regulator, such as a transistor-Zener-diode regulator, which includes resistors, transistors, and a Zener-diode, but the present disclosure is not limited thereto and other voltage regulator implementations may be used.

In another embodiment, when the electronic unit 20 is the microprocessor 20, the microprocessor 20 may be configured to switch into a low power consumption mode. For example, the microprocessor 20 may switch into the low power consumption mode when it detects that the power or current supplied thereto has dropped below a threshold power or threshold current, respectively. The power supplied by the voltage regulator 72 of the AFE 70 may be weaker than an external voltage regulator 60 as in the embodiments shown in FIGS. 1 and 2 but may support smaller currents, for example, currents between about 5 mA and about 10 mA in a low power consumption mode. The low power consumption mode may be implementable by an application or computer program running on the microprocessor 20, in one or more computing devices, executing computer program instructions and interacting with other system components for performing the various functionalities described herein. The computer program instructions may be stored in a memory, which may be implemented in a computing device using a standard memory device, such as, for example, a random access memory (RAM).

In general, the electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

SOME REFERENCE NUMERALS 1 power supply system
10 battery cell stack
11 first node
12 second node
13 battery cell
15 switch control unit/relay control unit
17 power switch/relay
20 electronic unit/microprocessor
21 control line
30 first power supply
31 node
40 second power supply
50 switching unit
51 first diode
52 second diode
53 output node
60 voltage regulator
70 analog-front-end chip (AFE)
71 control line
72 internal voltage regulator
74 shunt
75 node
76 node
80 power supply regulator

What is claimed is:

1. A power supply system for a battery system of a vehicle, the power supply system comprising:
a switch control unit configured to control a power switch to switch an external load;
an electronic unit;
a first power supply electrically connected to the switch control unit and electrically connected to the electronic unit, the first power supply being configured to electrically supply the electronic unit in a normal mode;
a second power supply; and
a switching unit configured to, in a cold crank mode:
electrically disconnect the first power supply from the electronic unit when a voltage of the first power supply drops below a threshold voltage; and
electrically connect the second power supply to the electronic unit when the voltage of the first power supply drops below the threshold voltage such that the second power supply powers the electronic unit in the cold crank mode.

2. The power supply system of claim 1, wherein the first power supply is a board net voltage of the vehicle.

3. The power supply system of claim 2, wherein the second power supply is a battery cell stack comprising a plurality of battery cells.

4. The power supply system of claim 1, wherein the threshold voltage is between 5 V and 6 V.

5. The power supply system of claim 4, wherein the threshold voltage is between 5 V and 5.5 V.

6. The power supply system of claim 5, wherein the threshold voltage is between 5 V and 5.2 V.

7. The power supply system of claim 1, wherein the switching unit is configured to electrically connect the first power supply to the electronic unit and electrically disconnect the second power supply from the electronic unit when the voltage of the first power supply rises above the threshold voltage.

8. The power supply system of claim 1, wherein the switching unit comprises a first input electrically connected to the first power supply, a second input electrically connected to the second power supply, and an output electrically connected to the electronic unit.

9. The power supply system of claim 8, wherein the switching unit further comprises a first diode, a second diode, and an output node,
wherein the first power supply is electrically connected to the anode of the first diode, the second power supply is electrically connected to the anode of the second diode, and the output node is electrically connected to the cathode of each of the first and second diodes, and
wherein the output node is electrically connected to the electronic unit.

10. The power supply system of claim 9, wherein the second diode is a low drop-out diode.

11. The power supply system of claim 8, wherein the second power supply is a battery cell stack comprising a plurality of battery cells between a first node and a second node, the second node having a higher electrical potential than the first node and being electrically connected to the second input of the switching unit.

12. The power supply system of claim 11, further comprising a voltage regulator electrically interconnected between the second node of the battery cell stack and the second input of the switching unit,
wherein the voltage regulator is configured to reduce an input voltage received from the second node to an output voltage supplied to the switching unit.

13. The power supply system of claim 12, wherein the voltage regulator is a low-dropout regulator and is configured to output a voltage between about 5 V and about 6 V.

14. The power supply system of claim 11, further comprising an analog front-end chip that is electrically connected to the first node and the second node of the battery cell stack to receive the voltage therebetween,
wherein the analog front-end chip comprises an internal voltage regulator configured to reduce the received voltage to an output voltage that is lower than the received voltage, and
wherein the analog front-end chip is configured supply the output voltage to the second input of the switching unit.

15. The power supply system of claim 14, wherein the internal voltage regulator is a low-dropout regulator.

16. The power supply system of claim 14, wherein the internal voltage regulator is configured to output a voltage between about 5 V and about 6 V.

17. The power supply system of claim 1, further comprising a power supply regulator interconnected between the switching unit and the electronic unit, the power supply regulator being configured to regulate a received voltage to a supply voltage required by the electronic unit.

18. The power supply system of claim 1, wherein the electronic unit is a microprocessor.

19. The power supply system of claim 18, wherein the microprocessor is configured to switch into a low power consumption mode when the microprocessor detects that power supplied thereto has dropped below a threshold power.

20. A vehicle comprising the power supply system according to claim 1.

\* \* \* \* \*

UNITED STATES PATENT AND TRADEMARK OFFICE
CERTIFICATE OF CORRECTION

| | | |
|---|---|---|
| PATENT NO. | : 11,476,690 B2 | Page 1 of 1 |
| APPLICATION NO. | : 17/009325 | |
| DATED | : October 18, 2022 | |
| INVENTOR(S) | : Peter Kurcik et al. | |

It is certified that error appears in the above-identified patent and that said Letters Patent is hereby corrected as shown below:

In the Claims

Column 14, Line 48, Claim 14    After "configured" insert -- to --

Signed and Sealed this
First Day of August, 2023

*Katherine Kelly Vidal*
Katherine Kelly Vidal
*Director of the United States Patent and Trademark Office*